(12) United States Patent
Trim et al.

(10) Patent No.: US 10,970,858 B2
(45) Date of Patent: Apr. 6, 2021

(54) AUGMENTED REALITY FOR MONITORING OBJECTS TO DECREASE CROSS CONTAMINATION BETWEEN DIFFERENT REGIONS

(71) Applicant: INTERNATIONAL BUSINESS MACHINES CORPORATION, Armonk, NY (US)

(72) Inventors: Craig M. Trim, Ventura, CA (US); Stan K. Daley, Atlanta, GA (US); Michael Bender, Rye Brook, NY (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/412,922

(22) Filed: May 15, 2019

(65) Prior Publication Data

US 2020/0364884 A1 Nov. 19, 2020

(51) Int. Cl.
*G06T 7/292* (2017.01)
*G06T 7/70* (2017.01)
(Continued)

(52) U.S. Cl.
CPC .............. *G06T 7/292* (2017.01); *A01B 76/00* (2013.01); *G01S 19/42* (2013.01);
(Continued)

(58) Field of Classification Search
CPC . G06T 7/292; G06T 7/70; G06T 2207/30188; G06T 2207/30232;
(Continued)

(56) References Cited

U.S. PATENT DOCUMENTS 7,383,129 B1 6/2008 Baillot et al.
9,808,549 B2 11/2017 Welch et al.
(Continued)

OTHER PUBLICATIONS

Pogue, D., "8 Recognition Apps Work Almost Like Magic" Scientific American, https://www.scientificamerican.com/article/pogue-8-recognition-apps-work-almost-like-magic/ (Jul. 2013) pp. 1-8.
(Continued)

*Primary Examiner* — Haixia Du
(74) *Attorney, Agent, or Firm* — Tutunjian & Bitetto, P.C.; Michael A. Petrocelli

(57) ABSTRACT

A method for identifying the status of object within a region that includes designating at least one piece of equipment to be tracked and recording a history for the piece of equipment. The method may further include detecting when the piece of equipment is present within a region having a set of object restrictions. The method further includes comparing the set of object restrictions for the region to the history that is recorded for the piece of equipment that is present in the region to calculate a placement score with a hardware processor that indicates whether the history of the equipment is a match for the region that the equipment is present in. A sensory signal may be projector onto the equipment in an augmented reality setting, the sensory signal indicating whether the history of the equipment is a match for the region that the equipment is present in.

15 Claims, 7 Drawing Sheets

(51) Int. Cl.
  *G06K 9/00* (2006.01)
  *G06K 7/00* (2006.01)
  *A01B 76/00* (2006.01)
  *G01S 19/42* (2010.01)
  *A47J 47/14* (2006.01)
  *G06T 7/00* (2017.01)

(52) U.S. Cl.
  CPC ........ *G06K 9/00771* (2013.01); *G06T 7/0002* (2013.01); *G06T 7/70* (2017.01); *A47J 47/14* (2013.01); *G06T 2207/30188* (2013.01); *G06T 2207/30232* (2013.01)

(58) Field of Classification Search
  CPC .... A01B 76/00; G01S 19/42; G06K 9/00771; A47J 7/14
  See application file for complete search history.

(56) References Cited

U.S. PATENT DOCUMENTS

| | | |
|---|---|---|
| 2003/0210228 A1 | 11/2003 | Ebersole et al. |
| 2011/0148626 A1* | 6/2011 | Acevedo ............... G01S 5/0027 340/539.13 |
| 2015/0287182 A1 | 10/2015 | Herger et al. |
| 2017/0156304 A1 | 6/2017 | Hori et al. |
| 2017/0174731 A1 | 6/2017 | Kennedy et al. |
| 2017/0279957 A1* | 9/2017 | Abramson et al. ........................ H04M 1/72577 |
| 2018/0131765 A1 | 5/2018 | Puleston et al. |
| 2018/0189449 A1 | 7/2018 | Karumba et al. |
| 2018/0197624 A1* | 7/2018 | Robaina ................ G06F 40/289 |
| 2018/0211345 A1* | 7/2018 | Bean ....................... F16P 3/147 |
| 2018/0270244 A1 | 9/2018 | Kumar et al. |
| 2018/0325604 A1* | 11/2018 | Atarot ................... A61B 5/7425 |
| 2018/0351732 A1* | 12/2018 | Wang ...................... G06F 3/064 |
| 2019/0066239 A1* | 2/2019 | Touchette .............. G06F 3/011 |
| 2019/0259108 A1* | 8/2019 | Bongartz .............. A01B 79/005 |

OTHER PUBLICATIONS

Huber, D. et al. "Invasive Pest Species: Impacts on Agricultural Production, Natural Resources, and the Environment" Council for Agricultural Science and Technology (CAST) (Mar. 2002) pp. 1-9, No. 20.

Marchant, G. et al., "A new window of opportunity to reject process-based biotechnology regulation" Biotechnology in Agriculture and the Food Chain ( Dec. 2015) pp. 1-12, vol. 6, Issue 4.

Price, E., "Cicada Hunt Is Like Shazam for Insect Sounds" (Aug. 2013) pp. 1-2 https://mashable.com/2013/08/30/cicada-hunt-app/#ke1INwpDzkqR.

Blog: Agriculture Industry in the United States: 10 Key Facts and Figures, https://www.bizvibe.com/blog/category/Food-Beverages/, accessed on: Feb. 20, 2019, pp. 1-5.

* cited by examiner

AUGMENTED REALITY FOR MONITORING OBJECTS TO DECREASE CROSS CONTAMINATION BETWEEN DIFFERENT REGIONS

BACKGROUND

The present disclosure generally relates to methods and systems that determine whether an object is suitable for placement within a particular region, and more particularly the methods and systems described herein can mark an object to illustrate whether the object is suitable for a particular region.

Determining whether objects are present in their correct place or location in a venue (e.g., a lab, or an agriculture field), and whether objects have been properly treated prior to be introduced to new places can be important for certain industries, such as agriculture, medicine, food preparation, and scientific diagnostics. For example, pests and pathogens can be very costly to the agricultural industry with major investments dedicated to pest and pathogen management. While attention has been paid to controlling the problem at farms once a pest infestation has been identified, the dangers still exists that this problem is exacerbated by sharing tools inadvertently. For example, a shovel that is used in one farm field should not be used on an adjacent farm field, even one within the same general property. A pathogen that exists in a first farm field may be quickly spread to a second farm field via the use of boots, shovels and other implements and other implements and machinery. For this reason, the industry attempts to designate specific dedicated tools and/or instruments to specific fields, but the governance is challenging.

SUMMARY

In accordance with one aspect of the present disclosure, a method for identifying the status of object within a region is provided. In one embodiment, the method may include designating at least one piece of equipment to be tracked; and recording a history for the piece of equipment. The method may continue with detecting when the piece of the equipment is present within a region having a set of object restrictions. The set of object restrictions for the region is then compared to the history that is recorded for the piece of equipment that is present in the region to calculate a placement score with a hardware processor that indicates whether the history of the equipment is a match for the region that the equipment is present in. A sensory signal may be overlaid to the equipment in an augmented reality setting. The sensory signal indicates whether the history of the equipment is a match for the region that the equipment is present in.

In another aspect, a system for identifying the status of object within a region. The system for identified by status of the object may include memory for storing a history for a piece of equipment to be tracked; and at least one sensor for detecting when the piece of equipment is present within a region having a set of object restrictions. The system further includes at least one hardware processor for comparing the set of object restrictions for the region to the history that is recorded on the memory for the piece of equipment that is present in the region to calculate a placement score that indicates whether the history of the equipment is a match for region that the equipment is present in. A generator of perceptual information that produces sensory signals that are overlaid the equipment as present within the region. The sensory signal indicates whether the history of the equipment is a match for the region that the equipment is present in.

In another aspect, a computer readable storage medium is provided for identifying the status of object within a region. The computer readable storage medium including a computer readable program for identifying the status of object within a region. The computer readable program when executed on a computer causes the computer to perform the steps of designating at least one piece of equipment to be tracked; and recording a history for the piece of equipment. The method provided by the instructions on the computer readable storage medium also including the step of detecting when the piece of equipment is present within a region having a set of object restrictions. The computer readable storage medium also instructions for comparing the set of object restrictions for the region to the history that is recorded for the piece of equipment that is present in the region to calculate a placement score with a hardware processor that indicates whether the history of the equipment is a match for the region that the equipment is present in. The computer readable storage medium also providing for projecting a sensory signal to the equipment in an augmented reality setting. The sensory signal indicating whether the history of the equipment is a match for the region that the equipment is present in.

BRIEF DESCRIPTION OF THE DRAWINGS

The following description will provide details of preferred embodiments with reference to the following figures wherein.

DETAILED DESCRIPTION

Figure 1:
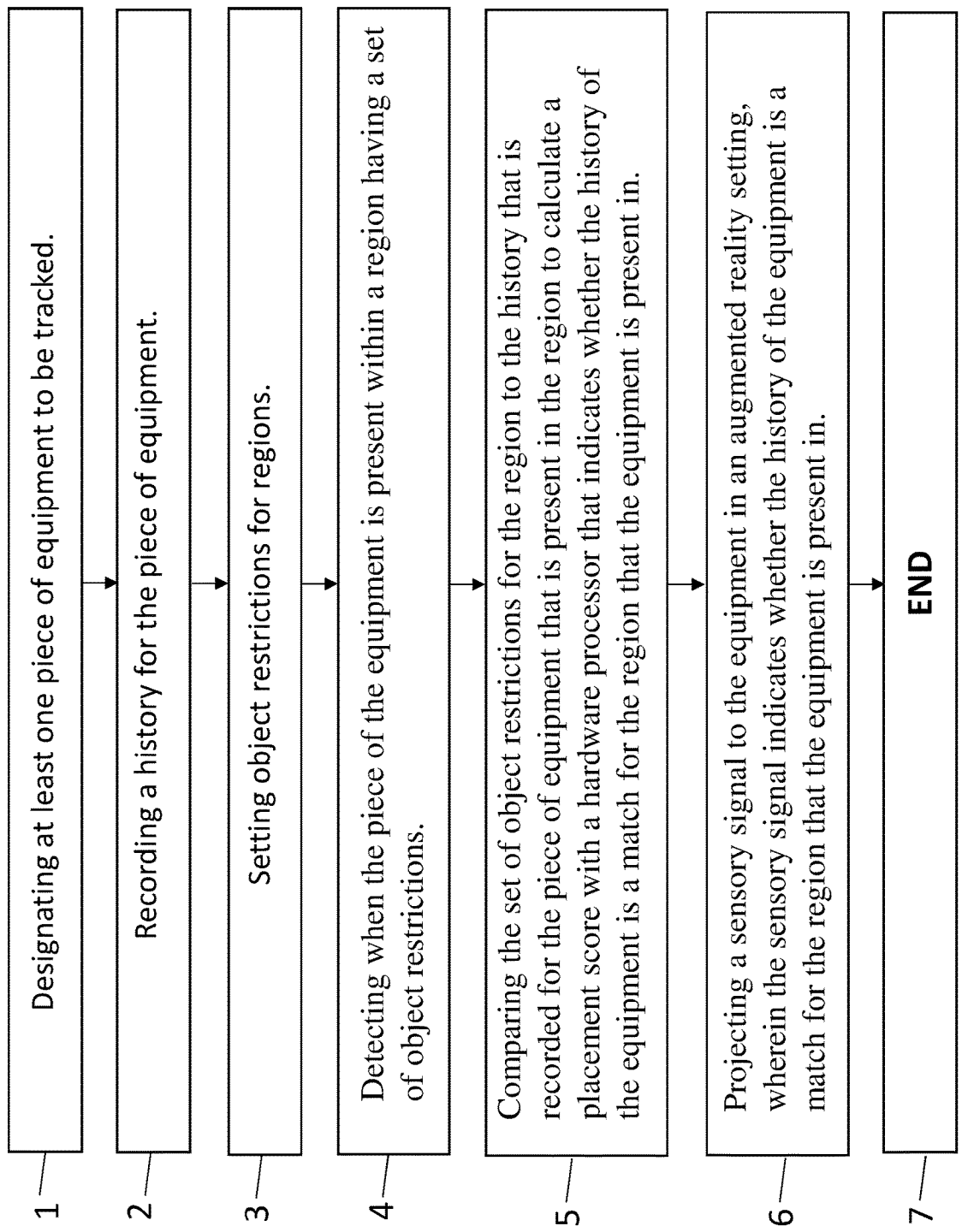
FIG. 1 is a flow/block diagram showing one embodiment a method for identifying the status of equipment within a region, such as agricultural tools within specific fields, in accordance with some embodiments of the present disclosure.

The methods, systems, and computer program products described herein relate to a method of visually presenting to an individual the safety status of a piece of equipment in regard to cross contamination. In some embodiments, the method includes electronically identifying and tracking a piece of equipment. As used herein, the term "equipment" denotes a tool used in the production of an object, tool in characterizing an object, and/or a transportation structure for transporting an object. In some embodiments, the methods, systems and computer program products can identify geofences to track the different locations, i.e., regions. A "geofence" is a virtual perimeter for a real-world geographic area. A geo-fence could be dynamically generated—as in a radius around a point location, or a geo-fence can be a predefined set of boundaries. The "geofence" can be fixed or set based on movement of an individual or other equipment and also based on being near a potential risk, e.g., infestation in farm, bio-risk at a hospital. The method and systems may also compare with a processor, e.g., hardware processor, when an item has changed zones, e.g., the regions that are identified by geofences. The methods and systems can provide for securely storing the change of zones and potential exposures and cleansing actions in a blockchain of memory. A "blockchain" is a growing list of records, called blocks, which are linked using cryptography. In some examples, each block contains a cryptographic hash of the previous block, a timestamp, and transaction data (generally represented as a Merkle tree). In some embodiments, the methods and systems present via "augmented reality" information about the state of a piece of equipment in regard to its suitability to be present within a region, e.g., safety for keeping the piece of equipment in a zone. As used herein, the term "augmented reality (AR)" is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. In some example, augmented reality brings components of the digital world into a person's perception of the real world and does so not as a simple display of data, but through the integration of immersive sensations that are perceived as natural parts of an environment. The methods, systems and computer program products are now described with greater detail with reference to FIGS. 1-6.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks. The flowchart and block diagrams in the FIGS. 1-9 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

FIG. 1 depicts one embodiment a method for identifying the status of equipment within a region. In the following descriptions an example is provided regarding how the methods described herein may be applied to an agricultural application. For example, pest and pathogens in the agricultural industry can be costly to production. While attention has been paid to controlling the problem at farms once an infestation has been identified, the dangers still exist that this problem is exacerbated by sharing tools inadvertently. A shovel that is used in one farm field should not be used on an adjacent farm field, even one within the same general property. A pathogen that exists in a farm field may be quickly spread by the use of boots, shovels, and other implements and machinery, which may all be included within the general definition of equipment to be tracked by the methods and systems described herein. The same problem exists in other embodiments. A gurney in a hospital needs to be cleaned before it goes from helping one patient to another. Doctors need to know if a person moved from a location with infectious disease to a general location without following the proper protocols. Restaurants need to make sure food storage keeps items apart (e.g. cooked food vs raw). Police need to be able to prove that evidence wasn't compromised, e.g., moved from clean areas of laboratories for characterization to other areas in which contaminants may be introduced to the evidence.

Figure 2:
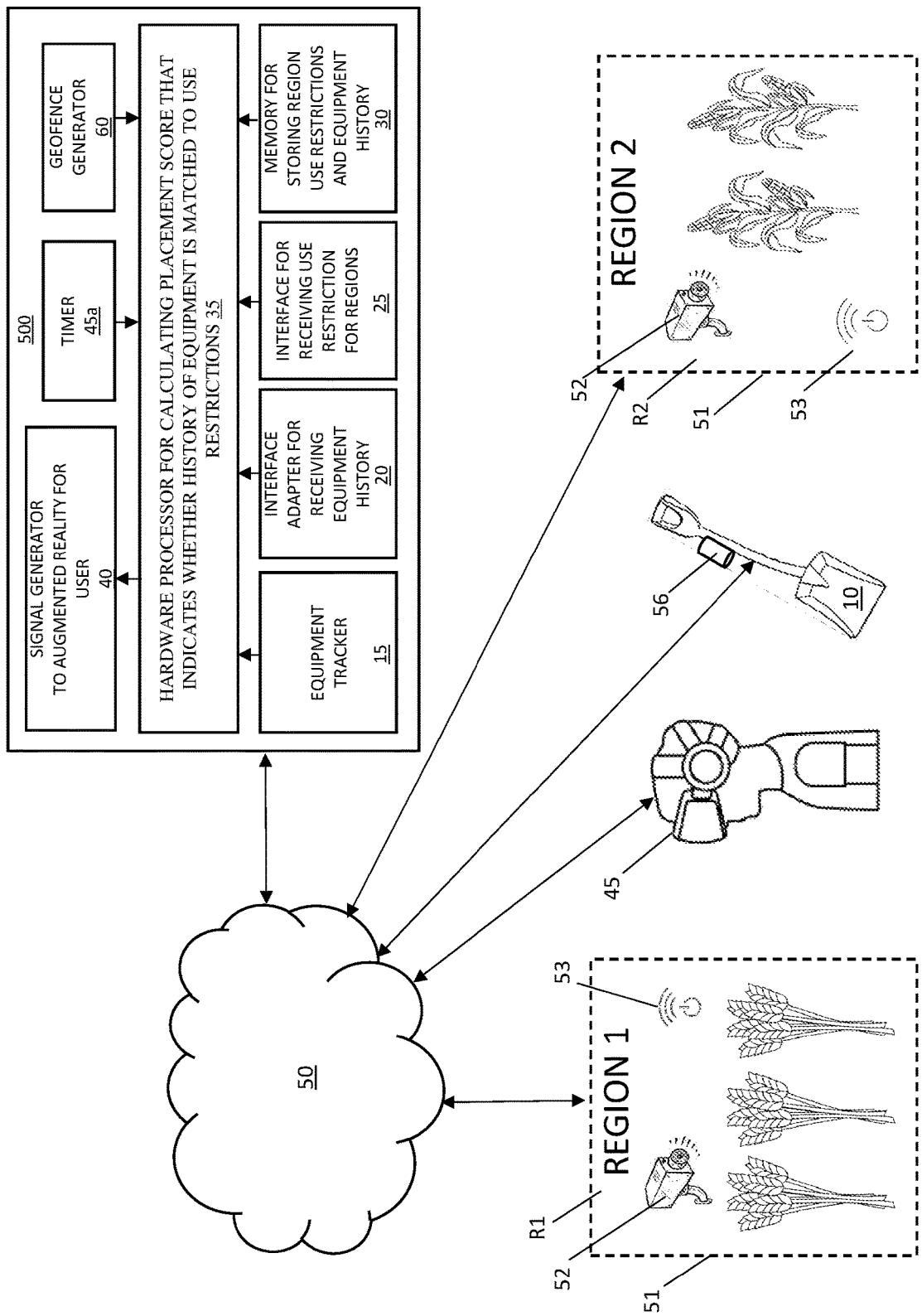
FIG. 2 is an illustration depicting one embodiment of a system for identifying the status of equipment within a region as described in the method illustrated in FIG. 1 applied to the application of tracking equipment between different fields of an agricultural business.
Figure 3:
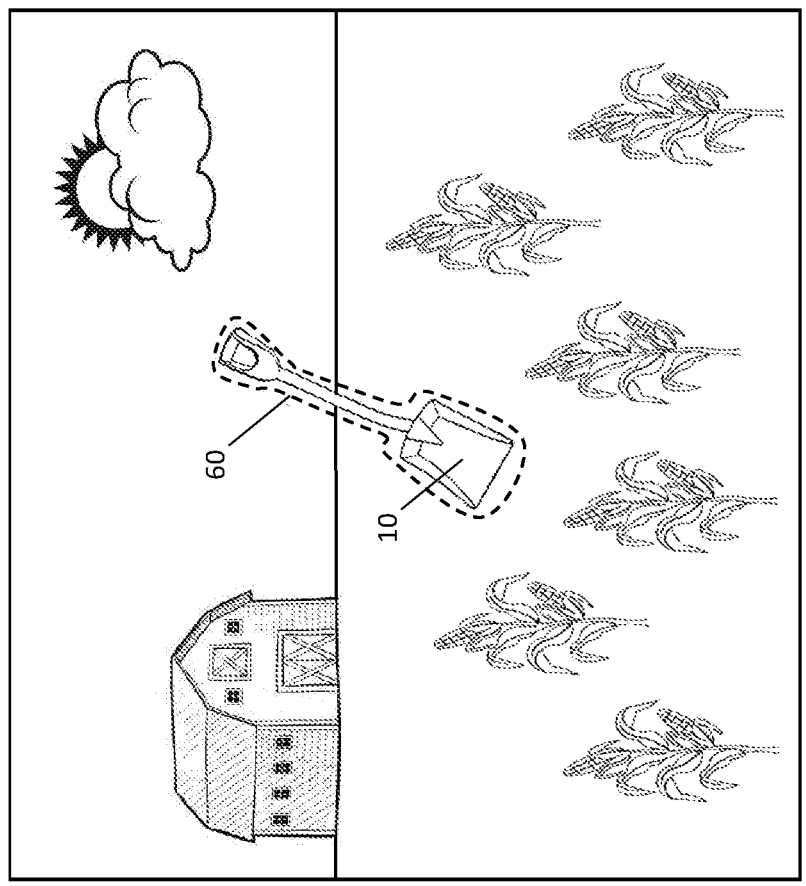
FIG. 3 is an illustration depicting one embodiment of an augmented reality setting, in which a sensory signal is being overlaid over the equipment to illustrates the equipment's status relative to the region in which the equipment is present.

It is noted that in some of the supplied figures, such as FIGS. 2 and 3, the methods and systems are described for agricultural applications, however, any of the aforementioned applications are suitable for use with the methods and systems described herein.

Figure 4:
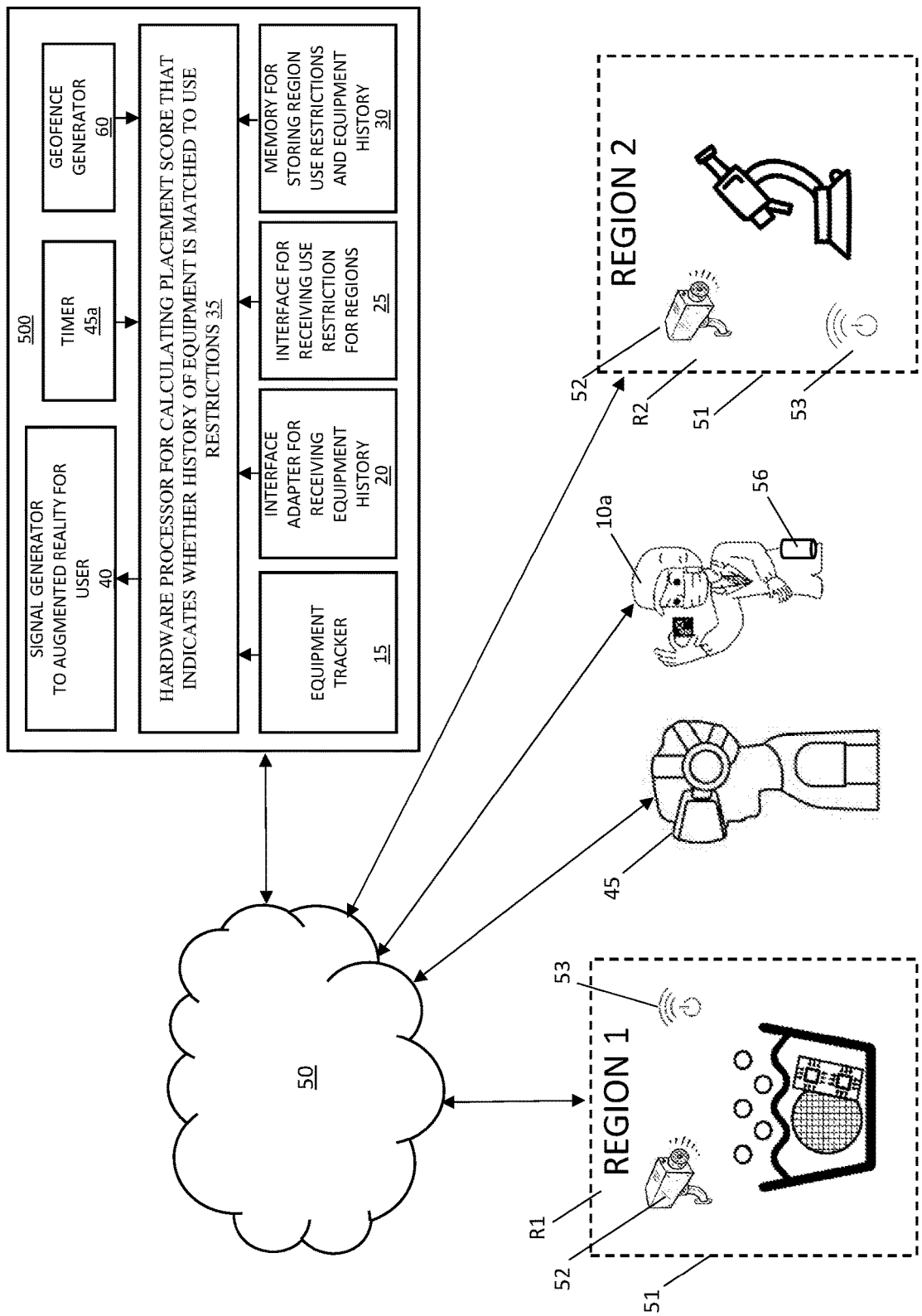
FIG. 4 is an illustration depicting one embodiment of a system for identifying the status of equipment within a region as described in the method illustrated in FIG. 1 applied to the application of tracking equipment between different regions of a microelectronics manufacturing environment.

In some embodiments, the methods, as depicted in FIG. 1, and the system, as depicted in FIGS. 2 and 4, present to an individual any equipment 10 is modified when looked at in an augmented reality setting, e.g. when view through a set of augmented reality glasses. The following colors are used as examples. The warnings can be configured with different colors, blinking, brightening, or any other configured interface change to facilitate usability concerns for color blindness, current background colors (e.g. don't show green over grass) or personal preference.

At block 1 of the method depicted in FIG. 1, the method can begin with designating at least one piece of equipment to be tracked; and recording a history for the piece of equipment. The equipment being designated for being tracked may be a piece of agricultural equipment that may be selected from the group consisting of shovels, tractors, two-wheeled tractors, wagons, trucks to transport product from the location, backhoes, front-end loaders, cultivators, cultipackers, plows, moldboard plows, chisel plows, disk plows, harrows, plastic mulch layer tractor attachment, sprayers, seed drills, traditional seed drills, broadcast seeders, rotary spreaders, seeders, transplanters, mowers, scythes, sickles, rakes, balers, round balers, square balers, large square balers, combine, harvester, manure spreader, hydroponics systems and combinations thereof. It is noted that in FIGS. 2 and 3 that the equipment is represented by a shovel identified by reference number 10. However, the type of equipment 10 being tracked can be any of the aforementioned examples. Additionally, the equipment 10 to be tracked can be any type of equipment used in hospitals, restaurants, laboratories, e.g., police evidence testing facilities, and combinations thereof.

In some embodiments, the present method that identifies, e.g., designates, and track equipment 10 from causing cross contamination across multiple regions R1, R2 can begin with entering the equipment to be tracked into a system 500 for identifying the status of object within a region (also referred to as system for reducing cross contamination 500). The equipment 10 can be entered into the system 500 by communication across an interface adapter for receiving equipment history 20. Communication to the interface adapter for receiving equipment history 20 may be from a virtual reality device, e.g., virtual reality glasses, laptop, desktop, handheld mobile device, camera, IoT device, authorization system responding to a request to send equipment to a location, or a combination thereof. In addition to tactile interfaces, such as keyboards, the communication to the interface adapter for receiving equipment history 20 can be voice entry via natural language processing (NLP). Natural language processing (NLP) is a subfield of computer science, information engineering, and artificial intelligence concerned with the interactions between computers and human (natural) languages, in particular how to program computers to process and analyze large amounts of natural language data. Natural language processing frequently involve speech recognition, natural language understanding, and natural language generation.

In further embodiments, the equipment 10 may be entered into the system by scanning a barcode on the equipment 10. The barcode includes the identifying information for the equipment, and the scanner can read the barcode and interface with the interface adapter for receiving equipment history 20. For the purposes of this disclosure, a "barcode" is a machine-readable representation of information that is converted into bits of data, such as 1's and 0's. The term "scanner" denotes a device including a light source, a lens and a photo conductor translating optical impulses into electrical ones.

Communication to the interface adapter for receiving equipment history 20 of the system for reducing cross contamination 500 may be over an internet type connection 50. For example, the interface that the user employs to enter the equipment designating information to the system for reducing cross contamination 500 can be in communication by a cellular radio to establish a connection to the Internet 50 via a cellular service such as a 4G (e.g., Mobile WiMAX, LTE) or 5G cellular data service. Alternatively, or in addition, the user interface for entering the designating information for the equipment may be in communication to the interface adapter for receiving equipment history 20 of the system for reducing cross contamination 500 via a WiFi radio to establish a WiFi connection through a WiFi access point or router which couples the IOT devices 52a, 52b or IOT hub to the Internet 50 (e.g., via an Internet Service Provider providing Internet service to the end user). Of course, it should be noted that the underlying principles of the methods and systems described herein are not limited to any particular type of communication channel or protocol.

The designation information for the equipment 10 may include equipment type. The designation information for the equipment 10 may also include a tag, or designation number, which identifies the specific piece of equipment within the equipment type. For example, the system for reducing cross contamination 500 may be tracking 500 shovels each having a different designation information. The designation information may also include the type of sensors employed on the equipment to track the equipment, as well as any information for tracking the equipment. For example, each of the shovels may have a sensor for enabling global positioning system (GPS) tracking. In other embodiments, the equipment 10 may be tagged to be tracked using sensors that are tracked by Electro-Magnetic, also known as magneto-harmonic or Barkhausen effect, acousto-magnetic, also known as magnetostrictive, radio frequency (8.2 MHz), microwave mechanisms and combinations thereof.

Referring to FIG. 1, at block 2 the method may continue with recording a history for the piece of equipment 10. Recording the history for the equipment may be manual by user entry of data using any of the same interfaces that have been described above for block 1. In this example, the history of the equipment 10 is provided by communication to the interface adapter for receiving equipment history 20 of the system for reducing cross contamination 500.

Recording the history for the equipment may also include location information that is automatically collected by tracking the equipment 10 via a plurality of tracking sensors, such as sensors for enabling global positioning system (GPS) tracking, and tracking of equipment that is tagged Electro-Magnetic tags, also known as magneto-harmonic or Barkhausen effect, acousto-magnetic tags, also known as magnetostrictive, radio frequency (8.2 MHz) responsive tags, tags that respond to microwave mechanisms and combinations thereof. In this example, the history of the equipment 10 is provided by communication to the interface adapter for receiving equipment history 20 of the system for reducing cross contamination 500. In some embodiments, the system for reducing cross contamination 500 may also include a timer 45a, e.g., a timer employing a clock to track time. Using the combination of the tracking sensors and the timer, the system for reducing cross contamination 500 can provide an equipment history illustrating how long equipment 10 has been in one region, e.g., a shovel being present in region one R1, which is a region in which wheat is being grown; and how long it is taken to transport the equipment 10 to a second region, e.g., the shovel being transported to region two R2, which is a region in which corn is being grown.

The history of the equipment 10 may include not only timing information and positioning information, but can also include a history of the treatments for the equipment 10. For example, a history of decontamination treatments, the duration of decontamination treatments, and the date of decontamination treatments can be part of the history of the equipment 10. Decontamination treatments may be simple cleanings, e.g., rinsing with water, to concentrated chemical cleans. It is noted that the chemical treatments are not limited to only agricultural cleaning, as the methods and systems described herein are not only limited to agricultural application, as illustrated above.

The method may continue at block 3 with setting object restrictions for the regions R1, R2. First, regions R1, R2, e.g., geographical regions are defined. A "region" can be any space that can be occupied by a piece of equipment 10. A "geofence" is a virtual perimeter for a real-world geographic area. A geo-fence 51 could be dynamically generated—as in a radius around a point location, or a geo-fence can be a predefined set of boundaries. The "geofence" can be fixed or set based on movement of an individual or other equipment and also based on being near a potential risk, e.g., infestation in farm, bio-risk at a hospital. Geofences 51 can be defined by global positioning systems (GPS), or radio-frequency identification (RFID) technology. The system providing the geofences may also enables software to trigger a response when a piece of equipment 10 being tracked enters or leaves a particular area, i.e., region defined by a geofence. Detection of when the equipment 10 enters or leaves a region R1, R2 defined by a geofence 51 can be provided by GPS, and/or tracking of equipment 10 that is tagged Electro-Magnetic tags, also known as magneto-harmonic or Barkhausen effect, acousto-magnetic tags, also known as magnetostrictive, radio frequency (8.2 MHz) responsive tags, tags that respond to microwave mechanisms and combinations thereof.

Although FIG. 2 illustrates two regions R1, R2, the present disclosure is not limited to only this example. For example, the number of regions R1, R2 that the system for reducing cross contamination 500 may monitor when tracking the equipment 10 may be equal to 1, 2, 4, 5, 10, 15, 20, 25, 40, 50, 60, 70, 80, 90, 100, 125, 150, 175, 200, 300, 400, 500, and 1000, as well as any range of regions R1, R2 having a lower limit selected from the aforementioned examples, and an upper limit selected from the aforementioned examples. Additionally, although FIG. 2 illustrates regions R1, R2 as being fields of agricultural products, e.g., fields of wheat (R1) and fields of corn (R2), the present disclosure is not limited to only this example. For example, for medical/hospital applications, the regions can represent different rooms, such as operating rooms, waiting rooms, rooms for analysis of test samples, rooms for patient recovery, and combinations thereof. In another example, such as a laboratory sample, the regions may be positioned to illustrate the different requirements of handling a test specimen during characterization.

Referring to FIG. 1, the method may continue at block 3 with setting object restrictions for the regions R1, R2. An "object restriction" can be a restriction on whether equipment from other regions may be allowed to be placed in the region R1, R2 having the object restriction; what types of equipment 10 can be positioned within the region R1, R2; what types of remedial treatments equipment must receive before entered the region; and/or how much time must pass from when a piece of equipment 10 leaves one region, e.g., region R1, before entering a second region, e.g., region R2.

Recording the object restrictions for the equipment may be by user entry of data using any of the same interfaces that have been described above for block 1 of FIG. 1. In this example, the object restrictions for the regions R1, R2 are transmitted to the system for reducing cross contamination 500 by communication to the interface adapter 25 for receiving use restrictions for the regions R1, R2 of the system for reducing cross contamination 500. For example, the object restrictions for the equipment may be entered into the system for reducing cross contamination 500 by user entry using voice commands interpreted by natural language processing (NLP).

The data for the equipment 10, the history of the equipment 10, the regions R1, R2, and the object restrictions for the regions R1, R2 may be stored in the memory for storing region use restrictions and equipment history 30 of the system for reducing cross contamination 500, as depicted in FIG. 2. The memory 30 may store the data in blockchain. Blockchain memory is a growing list of records, called blocks, which are linked using cryptography. In some embodiments, each block contains a cryptographic hash of the previous block, a timestamp, and transaction data (generally represented as a Merkle tree). By design, a blockchain is resistant to modification of the data. Once recorded, the data in any given block cannot be altered retroactively without alteration of all subsequent blocks, which requires consensus of the network majority. Although blockchain records are not unalterable, blockchains may be considered secure by design.

Referring to FIG. 1, the method further includes detecting when the piece of the equipment 10 is present within a region R1, R2 having a set of object restrictions. In some embodiments, detecting when the piece of equipment 10 is present within a region R1, R2 includes the use of global positioning system (GPS) sensors to determine the location of the piece of equipment 10 relevant to the region R1, R2, video cameras 51 to identify the equipment in the region or a combination thereof. In some embodiments, cameras 52 and IOT sensors 53 may be present within the regions R1, R2 for detecting when a piece of equipment 10 is present within one of the regions R1, R2.

GPS detection includes a GPS sensor that is a sensor 54 engaged to the equipment 10, in which the GPS sensor is tracked relative to the regions R1, R2, e.g., geofences 51 of the regions R1, R2. The memory for storing region use restrictions and equipment history 30 of the system for reducing cross contamination 500 has stored information on the region R1, R2 location. From the GPS signal tracking the equipment and being sent to the equipment tracking sensor interface 15, the system for reducing cross contamination 500 can track the equipment 10 relative to the locations of the regions R1, R2 that are stored in the memory 30.

In other embodiments, the equipment 10 can be tracked by being detected by video cameras 52 using video tracking. Video tracking is the process of locating a moving object (or multiple objects), which can be equipment 10, over time using a camera, e.g., video camera 52. The objective of video tracking is to associate target objects, e.g., equipment 10, in consecutive video frames. Video tracking may employ artificial intelligence utilizing computer software programs that analyze the images from video surveillance cameras in order to recognize humans, vehicles or objects, which all may be equipment 10 that is being tracked. The A.I. program functions by using machine vision. Machine vision is a series of algorithms, or mathematical procedures, which work like a flow-chart or series of questions to compare the object seen, which may be equipment 10, with hundreds of thousands of stored reference images of equipment in different angles, positions and movements. The stored reference images may be provided by the memory for storing region use restrictions and equipment history 30. The A.I. system itself if the observed object moves like the reference images, whether it is approximately the same size height relative to width, if it moves with similar speed, and if it is vertical instead of horizontal. Many other questions are possible, such as the degree to which the object is reflective, the degree to which it is steady or vibrating, and the smoothness with which it moves. Combining all of the values from the various questions, an overall ranking is derived which gives the A.I. the probability that a piece of equipment 10 that is being tracked has entered a region R1, R2. This type of A.I. is known as "rule-based" because a programmer sets rules for all of the equipment for which the user wishes to be tracked by the system for reducing cross contamination 500. The memory, e.g. hard-drive, that houses the program can either be located in the cameras 52 themselves or can be in a separate device that receives the input from the cameras, such as the memory for storing region use restrictions and equipment history 30 of the system for reducing cross contamination 500. Signals that can include equipment tracking data from the video cameras 52 may be received by the system for reducing cross contamination 500 across the equipment tracking sensor interface 15. The video cameras 52 may be in communication with the system for reducing cross contamination 500 over the internet 50.

In other embodiments, the equipment 10 can be tracked by internet of things (IOT) sensors 53. The IoT sensors 53 can be equipped with various types of sensors to collect information about themselves and their surroundings and provide the collected information to regarding equipment 10 within the regions R1, R2. In the methods and systems described herein, the IoT sensors 53 may be any device having the capability of taking video. More specifically, the IoT sensors 53 include a video camera that can record the presence or movement of equipment 10 within regions R1, R2 so that the images can be analyzed for determining whether registered equipment 10 is present within a region being tracked. Similar to the video cameras 52, the images taken from the IOT sensors 53 may be analyzed using artificial intelligence to determine what equipment 10 is being tracked within a region R1, R2.

Communication to the interface adapter for receiving equipment history 20 of the system for reducing cross contamination 500 may be over an internet type connection 50. For example, the interface that the user employs to enter the equipment designating information to the system for reducing cross contamination 500 can be in communication by a cellular radio to establish a connection to the Internet 50 via a cellular service such as a 4G (e.g., Mobile WiMAX, LTE) or 5G cellular data service. Alternatively, or in addition, the user interface for entering the designating information for the equipment may be in communication to the interface adapter for receiving equipment history 20 of the system for reducing cross contamination 500 via a WiFi radio to establish a WiFi connection through a WiFi access point or router which couples the IOT devices 52a, 52b or IOT hub to the Internet 50 (e.g., via an Internet Service Provider providing Internet service to the end user). Of course, it should be noted that the underlying principles of the methods and systems described herein are not limited to any particular type of communication channel or protocol.

It is noted that detecting the equipment 10 within the new region R1, R2 with the equipment tracking sensor 15 also results in the new location of the equipment 10 being stored as part of the equipment history in the memory for storing region use restrictions and equipment history 30 of the system for reducing cross contamination 500, as depicted in FIG. 2. For example, the new location for the equipment 10 is added to the block chain memory of the memory for storing region use restrictions and equipment history 30 of the system for reducing cross contamination 500.

Referring to FIG. 1, when equipment 10 is identified in a region R1, R2, the system for reducing cross contamination 500 then compares the set of object restrictions for the region R1, R2 to the history that is recorded for the piece of equipment 10 that is present in the region to calculate a placement score with a hardware processor 35 that indicates whether the history of the equipment 10 is a match for the region R1, R2 that the equipment 10 is present in. The placement score indicates that a piece of equipment 10 is suitable for the region R1, R2; that a piece of equipment 10 is not suitable for the region R1, R2; or that a piece of equipment 10 is suitable for the region R1, R2 after a remediation action.

In some embodiments, the tracking of equipment 10 starts when the item is entered into the system to be tracked. In some embodiments, determining whether an item, e.g., piece of equipment 10, is suitable for being tracked, the hardware processor 35 may employ a two prong test. In some embodiments, the first prong of the test being run by the hardware processor that calculates the placement score 35 determines whether there is no potential cross contamination of potential pathogens. This can be validated by visual inspection, interpretation of IoT devices (e.g. video or audio analysis to prove no infestation), or completion of a decontamination process approved for the item, e.g., piece of equipment 10. Once an item is known to be in a "clean" state, then the hardware processor that calculates the placement score 35 may run a second test (second prong of the test) to validate that the item does not cross a geofence 51 to a prohibited area. In one scenario, if a piece of equipment 10 is moved from a first region R1 into a second region R2 where there are no limits, then there is no concern of cross contamination, and the hardware processor 35 assigns a score indicating no or low likelihood of cross contamination.

In another scenario, in some embodiments, if a piece of equipment 10 is moved from a first region R1 into a second region R2, in which there is object restrictions for the second region R2, then all of the validations of the object restrictions to avoid cross contamination need to be fulfilled for the equipment 10 to enter the second region R2 and avoid cross contamination. For example, actions applied to the equipment 10 to meet each of the object restrictions, e.g., cleaning of the equipment 10, should be completed to successfully indicate a clean item. Depending on the risk associated with a piece of equipment 10—that is exposed to a pathogen and/or is crossing a geofence 51, the amount of time, exposure, remediation action applied to the equipment and risk to the item are weighed by the hardware processor 35 according to the product and a risk score is generated. For example, if a piece of equipment 10 is moved from a first region R1 to a second region R2, in which the second region R2 has object restrictions requiring that a remediation action be applied to the equipment 10 that was in the first region R1 before entering the second region R2, and there is no confirmation that the equipment 10 was treated with the appropriate remediation action, the processor assigns a score indicating a high likelihood of cross contamination.

To provide the placement score, the hardware processor 35 calculates the score from the variables, such as the equipment type, equipment previous locations (regions), the time from when the equipment 10 was in the previous region, and the region use restrictions for the region that the equipment is present in, which all may have been stored in the memory 30 for storing the region use restrictions and equipment history.

Referring to FIG. 1, once the placement score has been calculated by the hardware processor 35 that indicates whether the history of the equipment 10 is a match for the region R1, R2 that the equipment 10 is present in, the method may continue with block 6 by projecting a sensory signal to the equipment 10 in an augmented reality setting, wherein the sensory signal indicates whether the history of the equipment 10 is a match for the region R1, R2 that the equipment 10 is present in.

FIG. 3 depicts one embodiment of an augmented reality setting, in which a sensory signal 60 is being overlaid over the equipment 10 to illustrates the equipment's status relative to the region R1, R2 in which the equipment 10 is present. The sensory signal 60 indicates whether the history of the equipment is a match for the region that the equipment is present in. The sensory signal 60 that the user observes in the augmented reality (AR) setting may be in response to commands sent by the signal generator to augmented reality for the user 40 by the system for reducing cross contamination 500 that is depicted in FIG. 2. The signal generator to augmented reality for the user 40 receives commands regarding the placement score from the hardware processor 35 of the system for reducing cross contamination 500.

Referring to FIG. 2, the augmented reality setting is provided through an augmented reality headset 45. In some embodiments, in the augmented reality setting, e.g., the display of the augmented reality headset 45, wherein the sensory signals 60 are overlaid onto the equipment 10 as physically present within the region R1, R2 displayed in the augmented reality setting. In some embodiments, the sensory signals 60 may be a colored outline that is overlaid image of the physical equipment in the augmented reality setting. In this example, the color of the outline for the sensory signal 60 can indicate the status of the equipment 10, e.g., if the equipment 10 is suitable for the region R1, R2, the equipment 10 is not suitable for the region R1, R2, or if the equipment 10 is suitable for the region R1, R2 only with remedial treatment. A different color may be used as a sensory signal 60 for each different status. In some embodiments, the system for reducing cross contamination 500 sends instructions to modify background view surrounding objects, e.g., equipment 10, to augmented reality glass, e.g., the display of the augmented reality headset 45.

For example, if a piece of equipment 10 is viewed within a region R1, R2 by the user in the augmented reality setting, e.g., through the augmented reality headset 45, and there is no change in the image of the equipment 10; the equipment is not in an area, e.g., regions R1, R2, that needs to be monitored nor has it been used by someone which would require it to be properly cleaned.

For example, if a piece of equipment 10 is viewed within a region R1, R2 by the user in the augmented reality setting, e.g., through the augmented reality headset 45, and there is a green overlay or green outline for the sensory signal 60 in the augmented reality setting, e.g., through the augmented reality headset 45, the equipment 10 is currently in a watched state as potentially being exposed, but is still in the current location/use.

For example, if the piece of equipment 10 is viewed within a region R1, R2 by the user in the augmented reality setting, e.g., through the augmented reality headset 45, and there is a yellow overlay or yellow outline for the sensory signal 60 in the augmented reality setting, e.g., through the augmented reality headset 45, the equipment 10 has left the original location/use, e.g., region R1, R2, of potentially being exposed and needs to be disinfected or properly cleaned. Any piece of equipment 10 that comes into any zone without knowing its prior locations may require proper cleansing.

In another example, if the piece of equipment 10 is viewed within a region R1, R2 by the user in the augmented reality setting, e.g., through the augmented reality headset 45, and there is an orange overlay or orange outline for the sensory signal 60 in the augmented reality setting, e.g., through the augmented reality headset 45, the equipment 10 is in the yellow zone, e.g., region R1, R2, but is approaching a red area, e.g., region R1, R2.

For example, if the piece of equipment 10 is viewed within a region R1, R2 by the user in the augmented reality setting, e.g., through the augmented reality headset 45, and there is a red overlay or red outline for the sensory signal 60 in the augmented reality setting, e.g., through the augmented reality headset 45, the equipment 10 has left the original location/use, e.g., region R1, R2, and is now in another protected area, e.g., region R1, R2, and an exposure/risk is in place.

In some embodiments, the system for reducing cross contamination 500 can send reasons for the background change to AR glass, e.g., the display of the augmented reality headset 45, which can be displayed to the user as text on the display and/or can be audibly communicated to the user. In some embodiments, the AR system can also will project where to take the equipment.

It is noted that different colors are not the only signal for illustrating the status of the equipment in the augmented reality setting. For example, the sensory signal 60 can be any signal selected from the group consisting of visual, auditory, haptic, somatosensory, olfactory and combinations thereof.

Referring to FIG. 1, as block 7 the method may end.

As noted above, a number of applications are suitable for use with the methods and systems described with reference to FIGS. 1-3. For example, the system for reducing cross contamination 500 may be applied to winemaking or vinification. In this industry, farmers and operators can be concerned above moving equipment 10, e.g., a shovel, from one location to another, e.g., between regions. The user can wear AR glasses when on a vineyard to validate that no contamination has occurred by cross contamination through improperly moved or treated equipment 10. When the user views equipment, the AR glasses can remind the user to properly clean it prior to movement.

In another application, system for reducing cross contamination 500 may be applied to hospitals having infectious disease center. Users entering the infectious disease center must wear protective gear when entering the room. As they leave, the protective gear is put in a special room. The system for reducing cross contamination 500 may be applied to this scenario.

In yet another hospital application, an orderly may be pushing a gurney through the halls. In this application, the system for reducing cross contamination 500 can send instructions to AR glasses worn by the orderly to instruct the orderly to clean the gurney cleaned prior to bringing it back to another portion of the hospital, such as the emergency room (ER), for the next patient.

The system for reducing cross contamination 500 may also be applied to the food preparation/restraint industry. For example, as food is delivered and prepared, the trays are tagged with RFID tags, and their movement is tracked to make sure that cold and hot plates are not stored together. The status of the cold and hot plates can be tracked using a set of AR glasses in combination with the system for reducing cross contamination 500, as described in FIG. 1. In this example, when one tray is put in the wrong location, all of the trays in that location are flagged in the augmented reality setting as red until they are disposed of and put through a dishwasher.

FIG. 2 is an illustration depicting one embodiment of a system 500 for identifying the status of equipment 10 within a region R1, R2 as described in the method illustrated in FIG. 1.

Referring to FIG. 2, the system 500 (also referred to system for reducing cross contamination 500) for identifying the status of object, e.g., piece of equipment 10, within a region R1, R2 may include memory for storing a history for a piece of equipment 30 to be tracked; and at least one sensor for detecting when the piece of equipment 10 is present within a region R1, R2 having a set of object restrictions. The at least one sensor may include components for preparing geofences, e.g., geofence generator 60, that define the regions R1, R2, and a tracking sensor 56 on the equipment 10, which may be a GPS tracker or RFID sensor. The at least one sensor for detecting when the piece of equipment 10 is present within a region having a set of object restrictions includes a global positioning system (GPS) sensor, video camera sensors 52, IOT sensors 53, or a combination thereof. The tracking sensors 56 interface with the system for reducing cross contamination 500 via the equipment tracker interface 15. The system 500 further includes at least one hardware processor 35 for comparing the set of object restrictions for the region to the history that is recorded on the memory for the piece of equipment that is present in the region to calculate a placement score that indicates whether the history of the equipment is a match for region that the equipment is present in. The system 500 may further include a generator of perceptual information 40 that produces sensory signals that are overlaid the equipment 10 as present within the region R1, R2, the sensory signal indicating whether the history of the equipment 10 is a match for the region R1, R2 that the equipment 10 is present in. The generator of perceptual information 40 that produces sensory signals produces an indicator, e.g., sensory signal 60, that is overlaid on the equipment 10 as present within the region R1, R2 may work in conjunction with an augmented reality headset 45. Referring to FIG. 2, the system 500 may also include at least one interface 20 for entering the history of the equipment into the system and at least one interface 25 for entering the use restrictions for the regions R1, R2.

FIG. 4 illustrates yet another application for the system for reducing cross contamination 500 that has been described herein. FIG. 4 is an illustration depicting one embodiment of a system for identifying the status of equipment within a region R1, R2 as described in the method illustrated in FIG. 1 applied to the application of tracking equipment between different regions of a microelectronics manufacturing environment. In one example, the microelectronics being manufactured may be a semiconductor or memory device, which can include field effect transistors (FETs), metal oxide semiconductor field effect transistors (MOSFETs), complementary metal oxide (CMOS) semiconductor devices, transistors including nanostructures, such as nanowires, nanotubes, nanosheets etc., random access memory (RAM) devices, dynamic random access memory (DRAM) devices, flash memory components, trench memory components, as well as combinations thereof, and other like microelectronic structures. In this example, the first region R1 is a processing region, such as a room including a deposition process, e.g., chemical vapor deposition (CVD) process, etch process, photolithography process or a combination thereof. In this example, the second region R2 may be an inspection room, such as optical inspection. Each of the first and second regions R1, R2 may have geofences 51, as well as video cameras 52, and IOT sensors 53. The use of these items for tracking equipment using the system for reducing cross contamination 500 has been described above with reference to FIGS. 1-3. In this example, the equipment to be tracked may be articles of clean room clothing 10$a$. The tracking of the clean room clothing 10$a$ depicted in FIG. 4 is similar to the agricultural equipment 10 being tracked in the example described above with reference to FIGS. 1-3. For example, the clean room clothing 10$a$ may include a tracking sensor 56 to facilitate tracking of the equipment.

Figure 5:
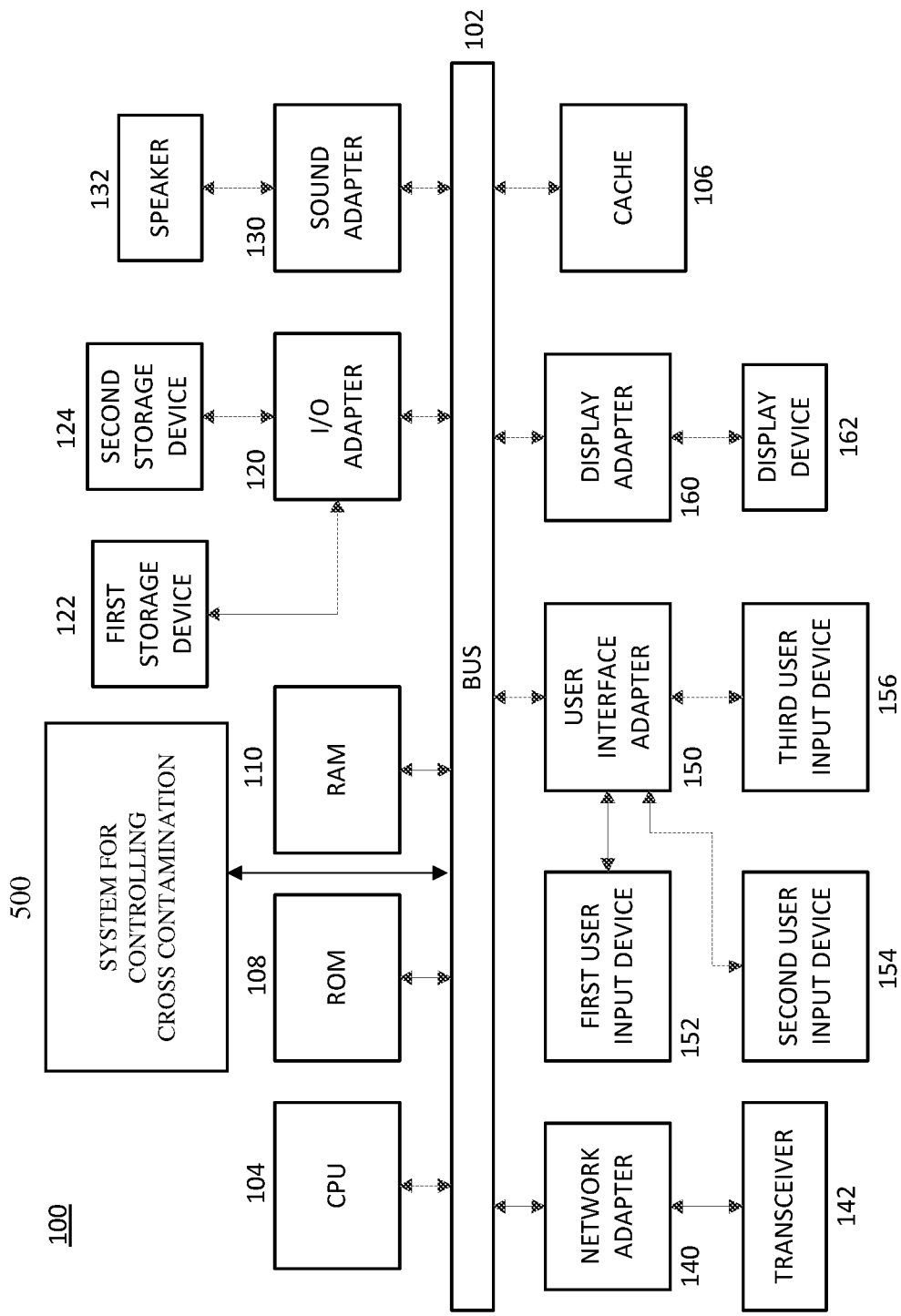
FIG. 5 is a block diagram illustrating one embodiment of a system for identifying the status of equipment within a region, in accordance with an embodiment of the present invention.

FIG. 5 illustrates a processing system 100 used by or comprised by the system 500 of FIGS. 2 and 4 for reducing cross contamination, in accordance with the methods and systems described above in FIGS. 1-4. The bus 102 interconnects the plurality of components for the system 500 described above with the components depicted in the computer system 100 depicted in FIG. 4.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 100 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100, which can include the system for reducing cross contamination 500.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

While FIG. 5 shows the computer system 100 as a particular configuration of hardware and software, any configuration of hardware and software, as would be known to a person of ordinary skill in the art, may be utilized for the purposes stated supra in conjunction with the particular computer system 100 of FIG. 5. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transistory computer readable storage medium that includes a computer readable program for identifying the status of object within a region. The non-transitory computer readable program when executed on a computer causes the computer to perform the steps of designating at least one piece of equipment to be tracked; recording a history for the piece of equipment; and detecting when the piece of equipment is present within a region having a set of object restrictions. The non-transitory computer readable program when executed on a computer also causes the computer to perform the steps of comparing the set of object restrictions for the region to the history that is recorded for the piece of equipment that is present in the region to calculate a placement score with a hardware processor that indicates whether the history of the equipment is a match for the region that the equipment is present in; and projecting a sensory signal to the equipment in an augmented reality setting, the sensory signal indicating whether the history of the equipment is a match for the region that the equipment is present in.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 6:
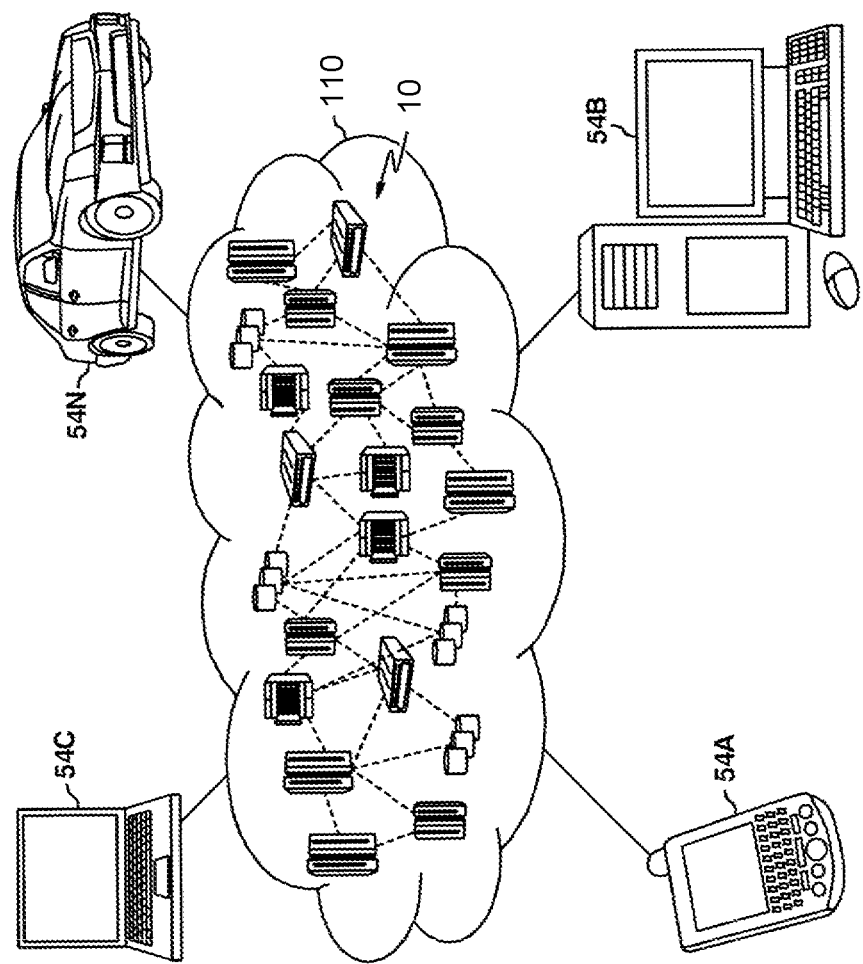
FIG. 6 depicts a cloud computing environment according to an embodiment of the present disclosure.

Referring now to FIG. 6, illustrative cloud computing environment 110 is depicted. As shown, cloud computing environment 110 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 110 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
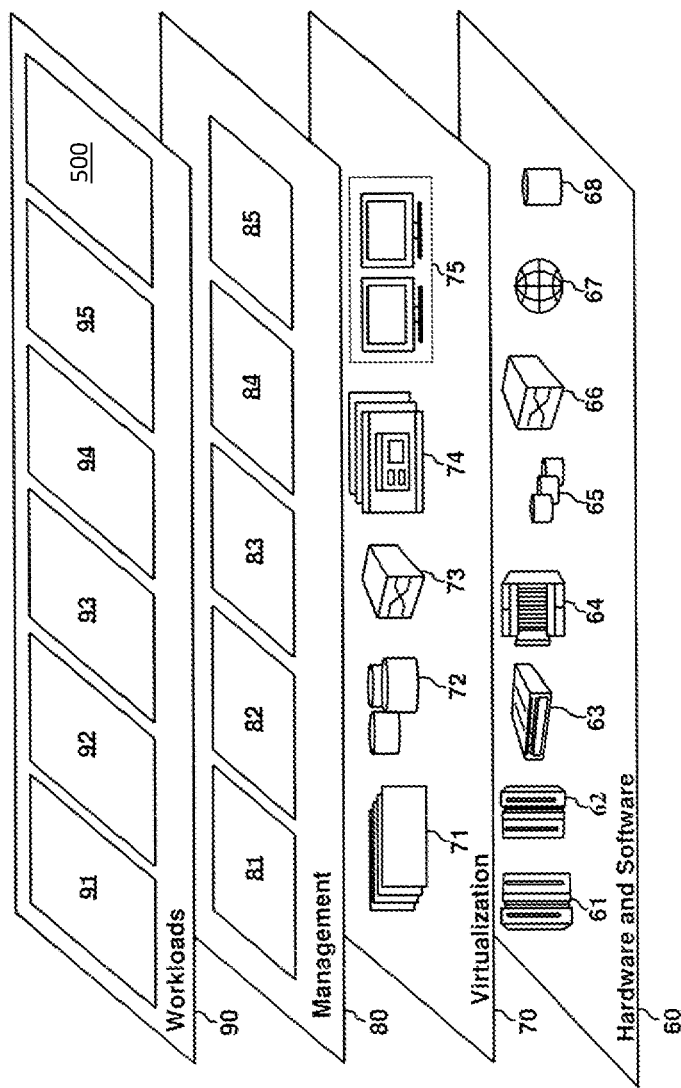
FIG. 7 depicts abstraction model layers according to an embodiment of the present disclosure.

Referring now to FIG. 7, a set of functional abstraction layers provided by cloud computing environment 110 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a system 500 for identifying the status of equipment in accordance with FIGS. 1-7.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for identifying the status of object within an agricultural field region comprising:
    designating at least one piece of agricultural equipment to be tracked;
    recording a history for the piece of agricultural equipment, the history including a recordation of previous agricultural field locations and constraints for the previous agricultural field locations;
    detecting when the piece of agricultural equipment is present within a region having a set of object restrictions related to the constraints for the previous locations recorded in the history for the piece of agricultural equipment, wherein said detecting of when the piece of agricultural equipment is present within a region comprises the use of global positioning system (GPS) sensors to determine the location of the piece of agricultural equipment relevant to the agricultural field region;
    comparing the set of object restrictions for the region to the constraints for the previous agricultural locations recorded in the history that is recorded for the piece of agricultural equipment that is present in the agricultural field region to calculate a placement score with a hardware processor that indicates whether the history for the piece of the agricultural equipment is a match for the agricultural field region that the agricultural equipment is present in; and
    projecting a sensory signal to the agricultural equipment in an augmented reality setting, the sensory signal indicating whether the history for the piece of the agricultural equipment is a match for the agricultural field region that the piece of the agricultural equipment is present in.

2. The method of claim 1, wherein the augmented reality setting is provided through an augmented reality headset.

3. The method of claim 2, wherein the sensory signal is overlaid the agricultural equipment as physically present within the agricultural field region displayed in the augmented reality setting.

4. The method of claim 1, wherein the agricultural field region is defined by geofence borders.

5. The method of claim 1, wherein a set of object restrictions includes whether the agricultural equipment has been in other agricultural field regions prior to the present agricultural field region, whether a greater than minimum time has passed since the agricultural equipment was in the other agricultural field regions, whether the agricultural equipment was sterilized prior being in the present agricultural field region, whether the agricultural equipment is a specific type of equipment, or combinations thereof.

6. The method of claim 1, wherein the placement score indicates that a piece of agricultural equipment is suitable for the agricultural field region, that the piece of agricultural equipment is not suitable for the agricultural field region, or that a piece of agricultural equipment is suitable for the agricultural field region after a remediation action.

7. The method of claim 1, wherein the sensory signal is of a signal type selected from the group consisting of visual, auditory, haptic, somatosensory, olfactory and combinations thereof.

8. A system for identifying the status of object within an agricultural field region comprising:
    memory for storing a history for a piece of agricultural equipment to be tracked, wherein the history includes recordation of previous agricultural field locations and constrains for the previous agricultural field locations;
    at least one sensor for detecting when the piece of agricultural equipment is present within agricultural field region having a set of object restrictions related to the constraints for the previous agricultural field locations recorded in the history for the piece of agricultural equipment, wherein said detecting of when the piece of agricultural equipment is present within the agricultural field region comprises the use of global positioning system (GPS) sensors to determine the location of the piece of agricultural equipment relevant to the agricultural field region;
    at least one hardware processor for comparing the set of object restrictions for the agricultural field region to the constraints for the previous agricultural locations recorded in the history that is recorded on the memory for the piece of agricultural equipment that is present in the agricultural field region to calculate a placement score that indicates whether the history of the piece of agricultural equipment is a match for region that the agricultural equipment is present in; and
    a generator of perceptual information that produces sensory signals that are overlaid the agricultural equipment as present within the agricultural field region, the sensory signal indicating whether the history of the agricultural equipment is a match for the region that the piece of agricultural equipment is present in.

9. The system of claim 8, wherein the generator of perceptual information that produces sensory signals that are overlaid on the agricultural equipment as present within the agricultural field region includes an augmented reality headset.

10. The system of claim 8, further comprising an interface for entering the history of the piece of agricultural equipment into the system.

11. The system of claim 8, wherein the memory comprises blockchain memory.

12. The system of claim 8 further comprising a geofence generator for defining said regions.

13. The system of claim 8, wherein the at least one sensor for detecting when the piece of equipment is present within a region having a set of object restrictions further comprises video camera sensors.

14. The system of claim 8, wherein the sensory signal is of a signal type selected from the group consisting of visual, auditory, haptic, somatosensory, olfactory and combinations thereof.

15. A computer readable storage medium comprising a computer readable program for identifying the status of object within an agricultural field region, wherein the computer readable program when executed on a computer causes the computer to perform the steps of:

designating at least one piece of agricultural equipment to be tracked;

recording a history for the piece of agricultural equipment, the history including a recordation of previous agricultural field locations and constraints for the previous agricultural field locations;

detecting when the piece of equipment is present within a region having a set of object restrictions, wherein said detecting of when the piece of agricultural equipment is present within an agricultural field region comprises the use of global positioning system (GPS) sensors to determine the location of the piece of agricultural equipment relevant to the agricultural field region;

comparing the set of object restrictions for the region to the constraints for the previous agricultural locations recorded in the history that is recorded for the piece of agricultural equipment that is present in the agricultural field region to calculate a placement score with a hardware processor that indicates whether the history of the piece of equipment is a match for the region that the agricultural equipment is present in; and projecting a sensory signal to the agricultural equipment in an augmented reality setting, the sensory signal indicating whether the history of the agricultural equipment is a match for the agricultural field region that the agricultural equipment is present in.

\* \* \* \* \*